US008698880B2

(12) United States Patent
Liou et al.

(10) Patent No.: US 8,698,880 B2
(45) Date of Patent: Apr. 15, 2014

(54) SYSTEM AND METHOD FOR TIME MULTIPLEXED STEREO DISPLAY AND DISPLAY APPARATUS

(75) Inventors: Jian-Chiun Liou, Kaohsiung County (TW); Chun-Jung Chen, Hsinchu County (TW); Kuen Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 497 days.

(21) Appl. No.: 12/957,408

(22) Filed: Dec. 1, 2010

(65) Prior Publication Data
US 2012/0140049 A1    Jun. 7, 2012

(51) Int. Cl.
*H04N 13/04* (2006.01)
(52) U.S. Cl.
USPC .................. 348/56; 348/E13.026; 345/690
(58) Field of Classification Search
USPC ............ 348/56, 690, E13.026; 345/102, 690
See application file for complete search history.

(56) References Cited

U.S. PATENT DOCUMENTS

| | | | |
|---|---|---|---|
| 6,348,916 B1 | 2/2002 | Jeong et al. | |
| 6,377,230 B1 * | 4/2002 | Yamazaki et al. | 345/7 |
| 6,535,241 B1 | 3/2003 | McDowall et al. | |
| 6,542,296 B2 * | 4/2003 | Lee et al. | 359/462 |
| 6,606,078 B2 * | 8/2003 | Son et al. | 345/6 |
| 6,727,867 B2 | 4/2004 | Divelbiss et al. | |
| 6,924,833 B1 | 8/2005 | McDowall et al. | |
| 7,400,308 B2 * | 7/2008 | Chang | 345/76 |
| 7,616,172 B2 * | 11/2009 | Lin et al. | 345/8 |
| 2007/0266412 A1 * | 11/2007 | Trowbridge et al. | 725/90 |
| 2009/0040186 A1 | 2/2009 | Esenther | |
| 2010/0007582 A1 * | 1/2010 | Zalewski | 345/8 |
| 2010/0026794 A1 * | 2/2010 | Chang | 348/56 |
| 2010/0026795 A1 * | 2/2010 | Moller et al. | 348/56 |
| 2010/0066816 A1 * | 3/2010 | Kane et al. | 348/51 |
| 2010/0182407 A1 * | 7/2010 | Ko et al. | 348/49 |

FOREIGN PATENT DOCUMENTS

| | | |
|---|---|---|
| CN | 101543085 A | 9/2009 |
| CN | 101840073 A | 9/2010 |

OTHER PUBLICATIONS

"First Office Action of China Counterpart Application", issued on Aug. 26, 2013, p. 1-p. 11, in which the listed references were cited.

* cited by examiner

*Primary Examiner* — Christopher S Kelley
*Assistant Examiner* — Ana Picon-Feliciano
(74) *Attorney, Agent, or Firm* — Jianq Chyun IP Office (57) ABSTRACT

A time multiplexed stereo display system is provided. The system includes a video player to output a sequence of image frames with respect to multiple stereo-displayed images. Each of the stereo-displayed images is formed by a first-view image and a second-view image with a parallax therebetween. The sequence of the image frames is sequentially displaying all of the first-view images and then sequentially displaying all of the second-view images to symmetrically transmitting first-view/second-view images. Further, a display panel receives the sequence of image frames for accordingly displaying the image frames. Multiple shutter eyeglasses, are controlled by the video player to transmit the stereo-displayed images, respectively, in accordance with the sequence of the image frames. Each of the shutter eyeglasses has a first-view glass and a second-view glass to accordingly transmit one of the first-view images and the second-view images in each display of the image frames.

17 Claims, 11 Drawing Sheets

SYSTEM AND METHOD FOR TIME MULTIPLEXED STEREO DISPLAY AND DISPLAY APPARATUS

BACKGROUND

1. Field of Disclosure

The present disclosure relates to the stereo image display, especially for the stereo image display applied with shutter glasses.

2. Description of Related Art

As known in the art, when two eyes looks at two images with a parallax, according to the visual function of human eye, the two image can form a stereo image in visual effect. In order to produce the stereo visual effect to the viewer when looking at the images displayed on the display panel, several mechanisms have been proposed. One of the displaying mechanisms for stereo visual effect is based on time multiplexed mechanism. Taking left eye and right eye for descriptions, a display panel can display a left-eye image and a right-eye image in a short time sequence. The left-eye image and the right-eye image have the same object content but with a parallax. By help of a specific eyeglass, the left-eye image and the right-eye image are separately entering the left eye and the right eye. Due to persistence of vision, the left-eye image and the right-eye image form a stereo image in visual effect.

Figure 1:
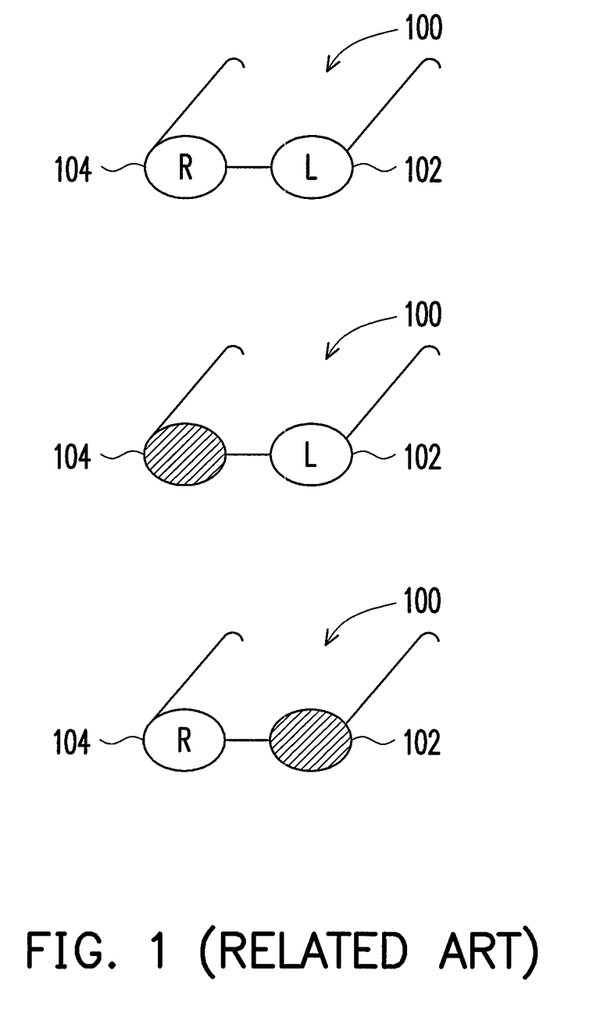
FIG. 1 is a drawing, schematically illustrating a conventional shutter eyeglasses.

For the specific eyeglasses to view the stereo image, its need to be design to respectively transmit the left-eye image and the right-eye image to the left eye and the right eye. FIG. 1 is a drawing, schematically illustrating a conventional shutter eyeglasses. In FIG. 1, a shutter eyeglasses 100 has a left-eye glass 102 indicated by L and a right-eye glass 104 indicated by R. The shutter eyeglasses 100 is for example a liquid crystal (LC) shutter eyeglasses. Due to the control of the LC, the glasses become transparent to the light or blocking the light. Under control, in one case, the left-eye glass 102 is switched to an open state for transmitting light while the right-eye glass 104 is closed for blocking the light, indicated by hatched pattern. As a result, the left-eye image can be viewed by, the left eye of the user. Likewise, when the right-eye image is to be received by the right-eye glass of the user, the left-eye glass 102 is closed for blocking the light while the right-eye glass 104 is switched to the open state for transmitting the right-eye image. The switching frequency can be 120 Hz, 240 Hz, 480 Hz, or higher, depending on the actual capability. Also, other type of shutter eyeglass can also be used.

Figure 2:
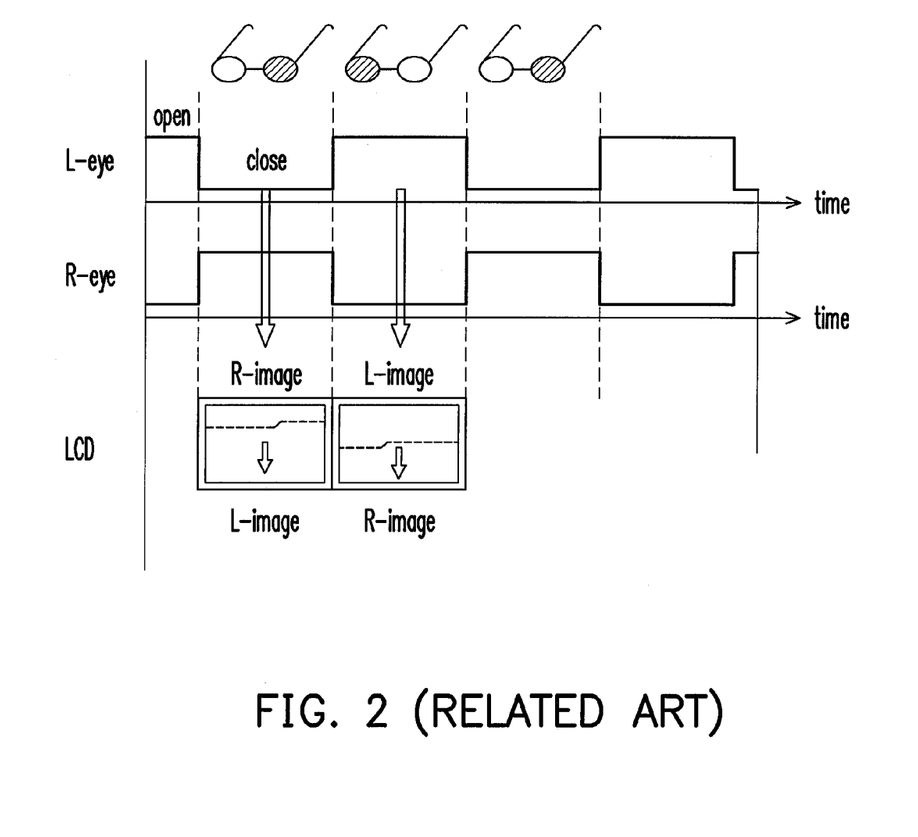
FIG. 2 is a drawing schematically illustrating the mechanism to produce the stereo visual effect.

FIG. 2 is a drawing schematically illustrating the mechanism to produce the stereo visual effect. In FIG. 2, the upper signal indicated by L-eye is the timing of open/close states for the left-eye glass, the lower signal indicated by R-eye is the timing of open/close states for the right-eye glass. In this situation, when the right-eye glass is close, the left-eye is open. Likewise, when the left-eye glass is close, the right-eye is open. When the right-eye image is to be transmitted by the left-eye glass, the LCD should display the R-image to replace the L-image at the previous image frame. In other words, the L-image is update by the R-image. When the time goes to the next image frame or the next time period for displaying the L-image in new image field, the left-eye glass is open and the right-eye glass is close. The LCD starts to update the displayed image of previous R-image with the L-image. The L-image and the R-image form the stereo visual effect in human visual function.

Figure 3:
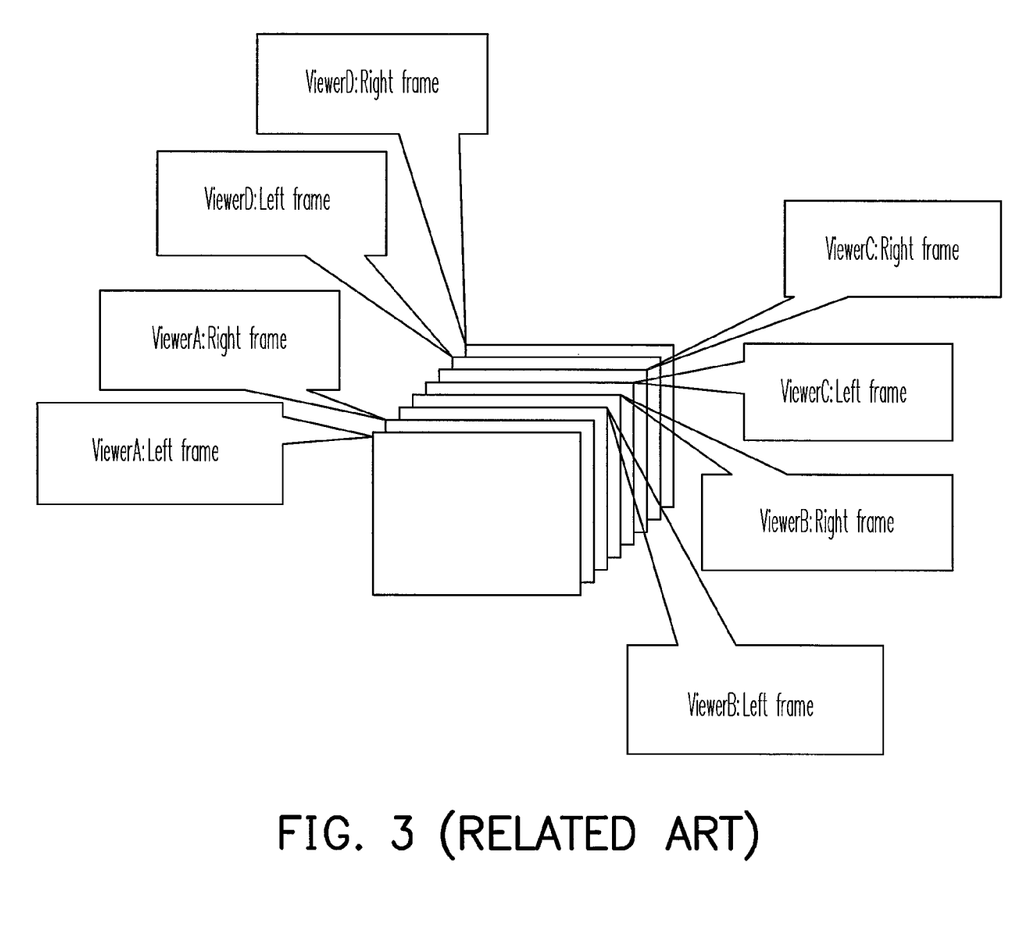
FIG. 3 is a drawing, schematically illustrating a conventional display mechanism for four viewers.

In a more recently development, since the displaying speed of the LCD is sufficiently fast, such as up to 480 Hz or even higher, the display system allows multiple users to individually view the different stereo images. FIG. 3 is a drawing, schematically illustrating a conventional display mechanism for four viewers. In FIG. 3, eight image frames are displayed by the screen of LCD panel. It should be noted that the conventional method generates the images for multiple viewers one at a time. The shutter eyeglasses for the viewer is also switched on one at a time. The first pair of two image frames is left frame and right frame for the viewer A. The second pair of two image frames is left frame and right frame for the viewer B. The third pair of two image frames is left frame and right frame for the viewer C. The fourth pair of two image frames is left frame and right frame for the viewer D. Each pair of two image frames may be all different or the same. However, different viewers would view the different specific image frames due the timing control of the shutter eyeglass in FIG. 1.

Figure 4:
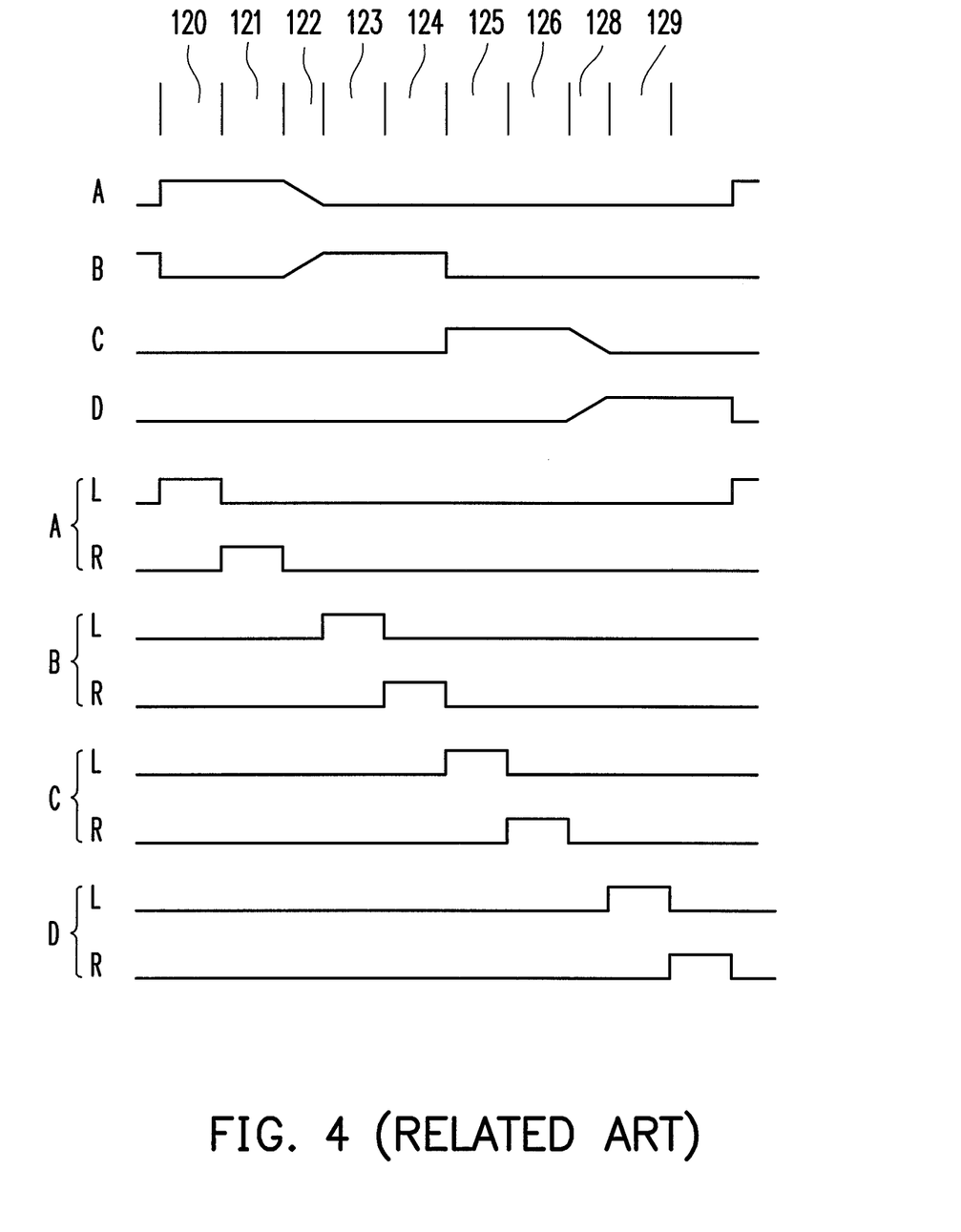
FIG. 4 is a drawing, schematically illustrating a conventional time control for four viewers to view four stereo images.

FIG. 4 is a drawing, schematically illustrating a conventional time control for four viewers to view four stereo images. In FIG. 4, the signal A represents the time period for the viewer A to view one individual image. The time period for the viewer A occupy two sub periods 120 and 121 for displaying the left-eye image and right-eye image. The shutter eyeglasses are controlled as indicated by the four groups of signals including L signal and R signal. It can be seen that the two eyes for the viewer are consecutively receiving the left eye image and right eye image. Then, this viewer has to wait for a long time to see the next image frame until all other viewers have also seen the current image frame. In other words, the left image and the right image are not symmetrically or periodically enter the left eye and the right eye of one viewer.

The conventional method to display the stereo visual image may cause uncomfortable to the eyes.

SUMMARY

The disclosure provides a system and method for time multiplexed stereo display and display apparatus with control of the backlight module. The performance for stereo visual effect can be improved.

In an embodiment of the disclosure, a time multiplexed stereo display system is provided. The system includes a video player to output a sequence of image frames with respect to multiple stereo-displayed images. Each of the stereo-displayed images is formed by a first-view image and a second-view image with a parallax therebetween, to have a symmetrical effect for the two eyes. The sequence of the image frames is sequentially displaying all of the first-view images and then sequentially displaying all of the second-view images. Further, a display panel receives the sequence of image frames for accordingly displaying the image frames. Multiple shutter eyeglasses are controlled by the video player to transmit the stereo-displayed images, respectively, in accordance with the sequence of the image frames. As a result, the two eyes of each viewer can have the same symmetric effect to receive the images. Each of the shutter eyeglasses has a first-view glass and a second-view glass to accordingly transmit one of the first-view images and the second-view images in each display of the image frames.

In an embodiment of the disclosure, a display apparatus is also provided. The display apparatus comprises a display panel, a backlight module, and a control unit. The display panel is to display an image, wherein the display panel for displaying image is divided into N display regions, N≥2. The backlight module is to provide a backlight source to the display panel, wherein the backlight module is also divided into N light regions. The control unit is coupled to the display panel and the backlight module to control the N display regions for sequentially displaying a part of the image and control the N light regions to be accordingly turned on/off for sequentially providing a portion of the backlight source to the display panel.

In an embodiment of the disclosure, a time multiplexed stereo display method is also provided to be implemented in a display system. The display system has a video player to output a sequence of image frames and a display panel to display the image frame. The method comprises providing a plurality of shutter eyeglasses, which have to symmetrically transmit images of multi-viewers. The interval between the left eye shutter glass and the right eye shutter glass being opened for the same viewer is the interval of transmitting all left eye images or all right eye images for all the other viewers. Multiple shutter eyeglasses each having a first-eye glass and a second-eye glass, wherein the first-eye glasses are opened one-by-one for just transmitting one of the image frames, after then, the second-eye glasses are opened one-by-one for just transmitting one of the image frames.

BRIEF DESCRIPTION OF THE DRAWINGS

The accompanying drawings are included to provide a further understanding of the disclosure, and are incorporated in and constitute a part of this specification. The drawings illustrate embodiments and, together with the description, serve to explain the principles of the disclosure.

DESCRIPTION OF THE EMBODIMENTS

In the disclosure, multiple shutter eyeglasses are used in a proposed operation sequence for viewing a stereo-displayed image. The eye loading can be more evenly distributed to the eyes of the multiple viewers. Also, by the proper control on the back light module, the image interference between two eyes can be reduced.

Several embodiments of the present invention are provided below. However, the invention is not limited by the embodiments. Further, the embodiments may allow proper combinations.

Figure 5:
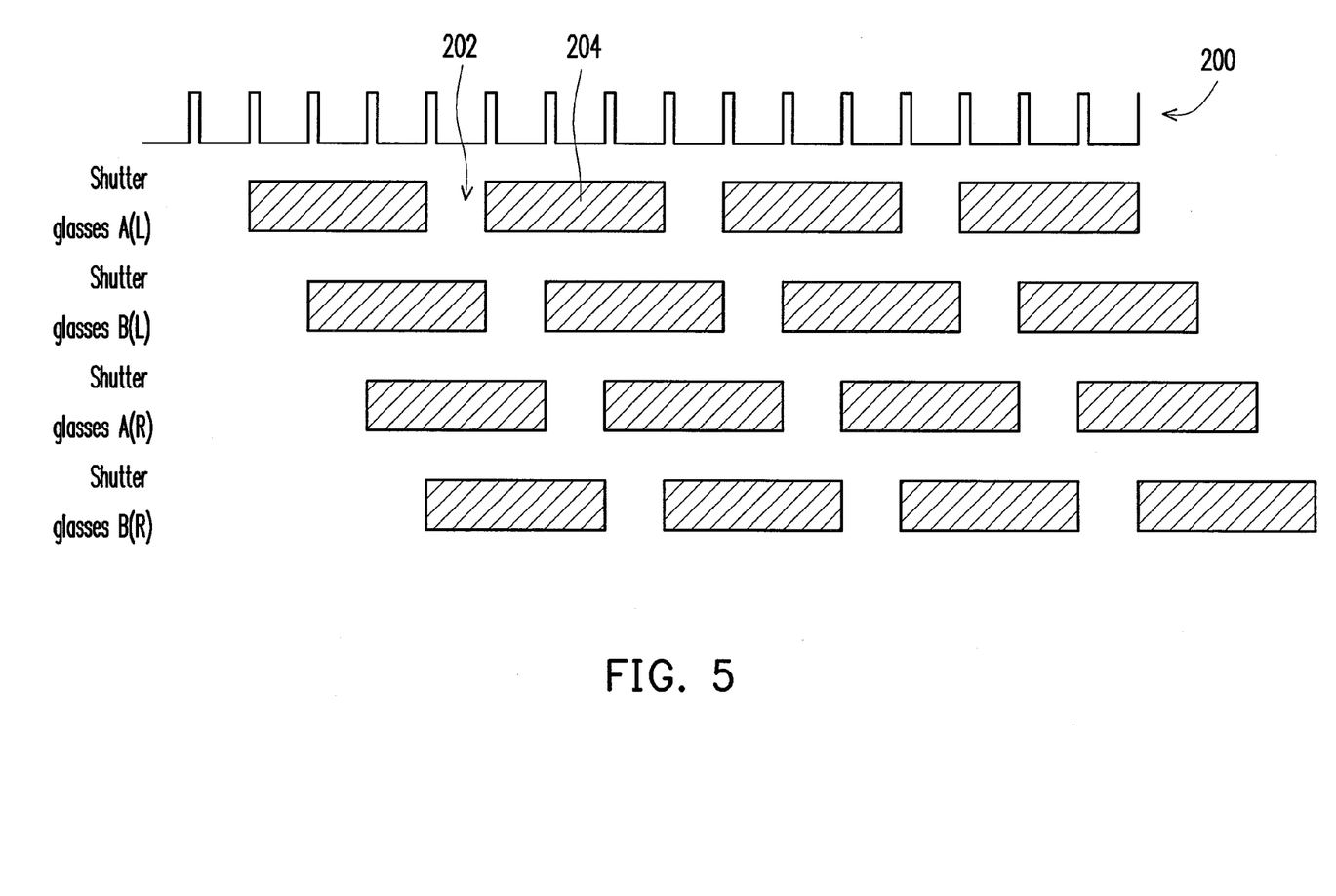
FIG. 5 is a drawing, schematically illustrating the operation mechanism of the shutter eyeglasses, according to an embodiment of the disclosure.

FIG. 5 is a drawing, schematically illustrating the operation mechanism of the shutter eyeglasses, according to an embodiment of the disclosure. In FIG. 5, taking two viewer A and B as an example, each viewer wears a shutter eyeglasses with left-eye glass and right-eye glass. The shutter function can open the glass or close the glass depending on the switching operation. The signal 200 is the vertical synchronous signal, in which each pulse represents a new image frame is displayed. For the left-eye glass of the viewer A, indicated by A(L), the open period 202 allows the image frame to be just viewed by left eye of the viewer A. The time period 204 represents a close state, which means that the image light cannot transmit through the left-eye glass of the viewer A. The right-eye glass for the viewer A is indicated by A(R) at the third row. As a result, for the viewer A, while the left eye can view the left-eye image, the right eye does not view the left-eye image. Also and, while the right eye can view the right-eye image, the left eye does not view the right-eye image. It can also be noted that the viewer B does not view the image frames for the viewer A. The left-eye image and the right-eye image respectively viewed by the left eye and the right eye can form a stereo visual effect due to human eye function. The viewer B cannot view the image viewed by the viewer A. Likewise, the viewer B can just view the displayed image belonging to the viewer B and cannot view the displayed image for the viewer A, in which the images have to be symmetrically transmitted for the left eye and the right eye of the same viewer. As a result, viewer A and viewer B can independently view the image contents, which may be the same or different.

Figure 6:
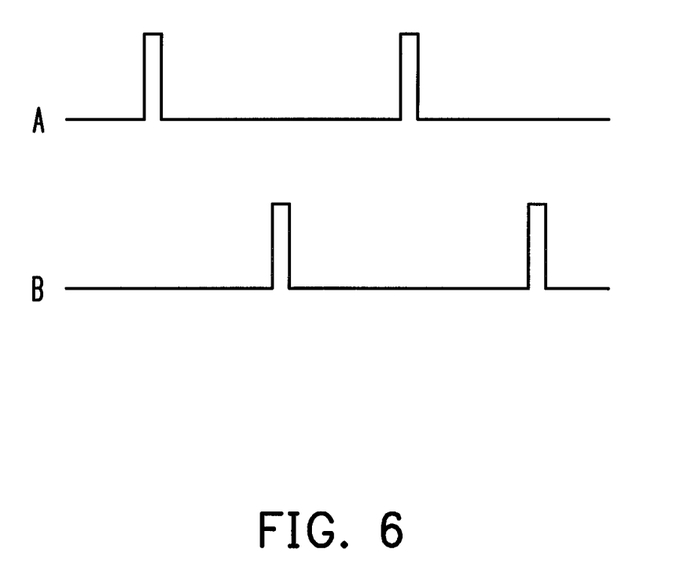
FIG. 6 is a drawing, schematically illustrating the timing to receive the field images for the left eye and the right eye in multiple viewers.

FIG. 6 is a drawing, schematically illustrating the timing to receive the field images for the left eye and the right eye in multiple viewers. In FIG. 6, based on the operation timing for the shutter eyeglasses in FIG. 5, the vertical synchronous signals belonging to the viewer A and the viewer B are briefly shown. For the viewer A, the first pulse signal represents that the left-eye image is viewed by the left eye of the viewer A. The second pulse signal represents that the right-eye image is viewed by the right eye of the viewer A. Likewise, the viewer B views the left-eye image and the right-eye image as indicated by the lower signal.

It should be noted that the left eye of the viewer B can view the image before the right-eye image of viewer A is displayed. The right eye of the viewer A can view the image before the right-eye image of the viewer B is displayed, in which the images have to be symmetrically transmitted for the left eye and the right eye of the same viewer. In this manner, the two eyes do not have to wait long until all of the other viewers completely view their full stereo-displayed image. In this manner, two eyes would be more comfortable to view the stereo image. In other words, this feature can also be referred as a feature of symmetric transmitting images between left eye and right eye of the same viewer. The left eye image and the right eye image are alternatively transmitted to the left eye and the right eye of the same viewer with the same interval. The interval is used to transmit the image of the same left eye or same right eye for other viewers. Taking the example starting to transmit the left eye image first, then it would be a group of left eye images with respect to multiple viewers are transmitted, after then a group of right eye images with respect to multiple viewers are transmitted. It can be represented by a sequence of LLLLRRRR; LLLLRRRR; . . . . For four viewers, in which L represents left eye images for the four viewers, R represents right eye images for the four viewers. The first group of left eye images and the first group of right eye images are for the first image frame. Then the next image frame is repeatedly transmitted with the same manner. Here, this manner for transmitting images produce the same loading for the left eye and the right eye and is therefore also referred as the symmetrical mechanism for transmitting images.

Figure 7:
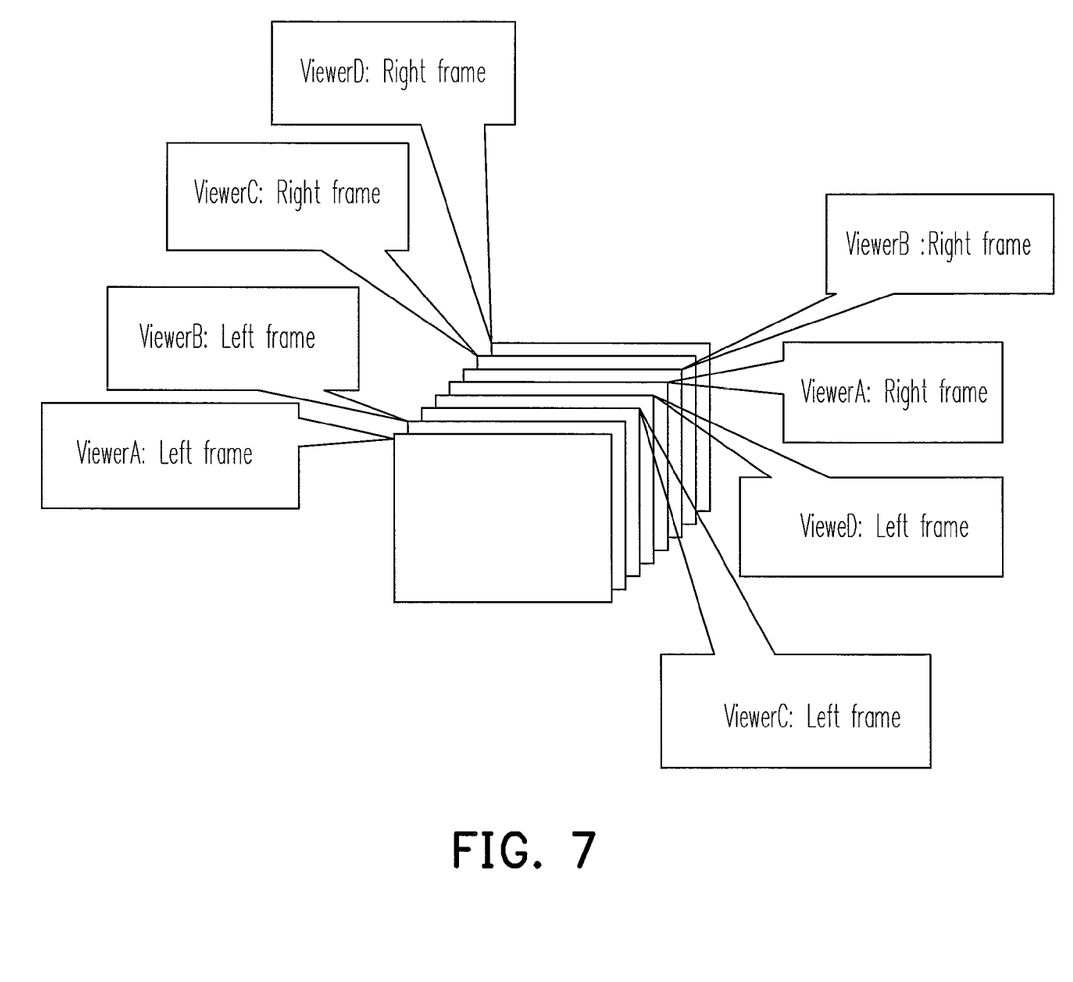
FIG. 7 is a drawing, schematically illustrating display mechanism for four viewers, according to an embodiment of the disclosure.

FIG. 7 is a drawing, schematically illustrating display mechanism for four viewers, according to an embodiment of the disclosure. In FIG. 7, the four left eye image frames with respect to four viewers A-D are sequentially transmitted. Then, the four right eye image frames with respect to four viewers A-D are sequentially transmitted. The left eye and the right eye are periodically receiving the image frames.

Figure 8:
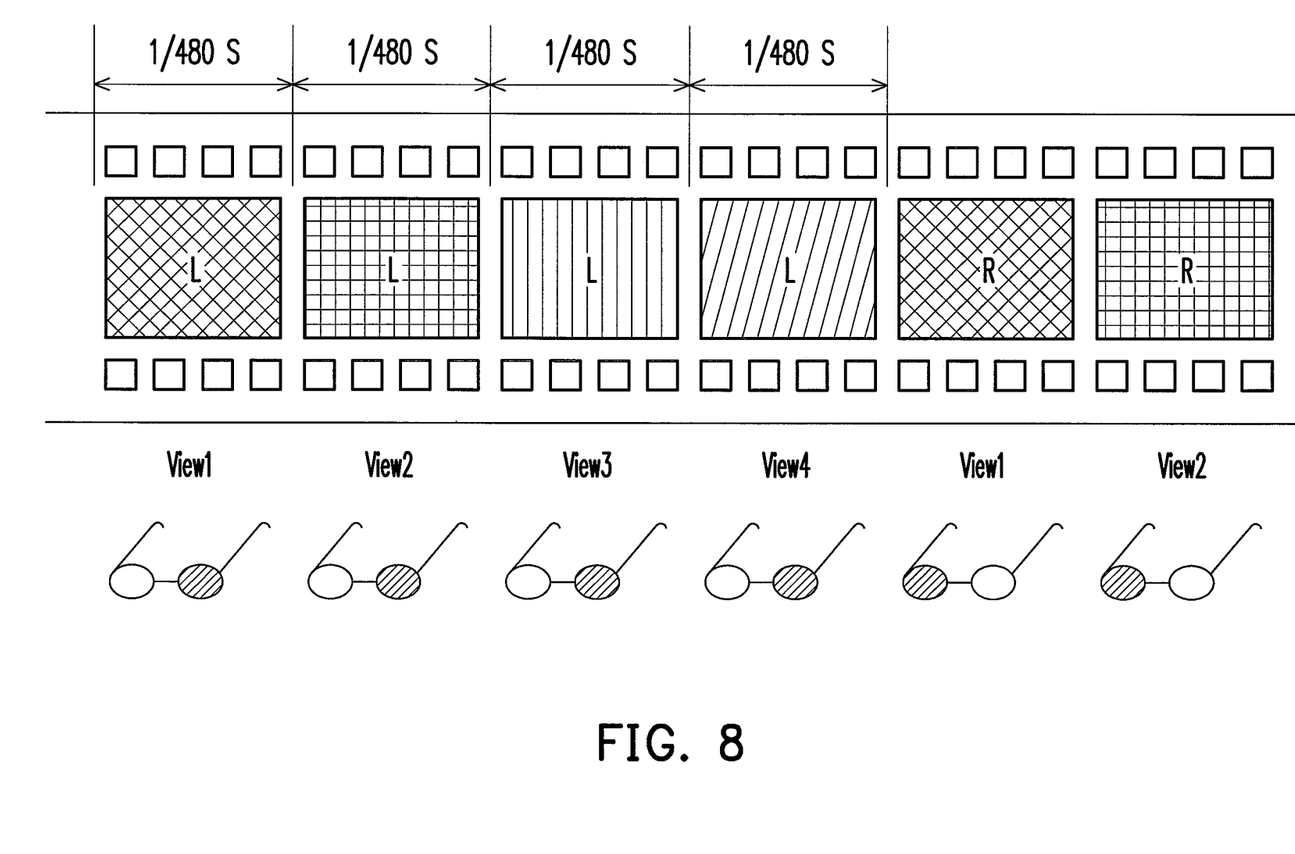
FIG. 8 is a drawing, schematically illustrating the timing relation between the image frames and the shutter eyeglasses for multiple viewers.

FIG. 8 is a drawing, schematically illustrating the timing relation between the image frames and the shutter eyeglasses for multiple viewers. As in FIG. 7, taking four viewers as another example, each image frame of the viewers, indicated by view1-view4. The four viewers each wears one shutter eyeglasses, in which the image frames have to be symmetrically transmitted to the left eye and the right eye of each viewer. Four different image contents are displayed as schematically shown in different patterns. The two image frames with the same hatched pattern represent the left-eye image and the right-eye image to form a stereo visual image for one viewer. In this example, the first image frame and fifth image frame are symmetrically received by the two eyes of the viewer 1. Each image frame is displayed by 1/480 second. In this manner, the left-eye image frames respectively belonging to the left eyes of the four viewers are sequentially displayed. After then, the right-eye image frames respectively belonging to the right eyes of the four viewers are sequentially displayed. The left-eye glasses are also sequentially opened. It should be noted that only the corresponding one of the glasses is open at each image frame. For example, when the first left-eye image is viewed by the left eye of viewer1, all the other shutter eyeglasses are closed and the right-eye glass of viewer1 is also closed. The same mechanism is applied for the other viewers. At the fifth image frame, the right-eye image of viewer1 is then displayed to form a stereo visual effect.

Figure 9:
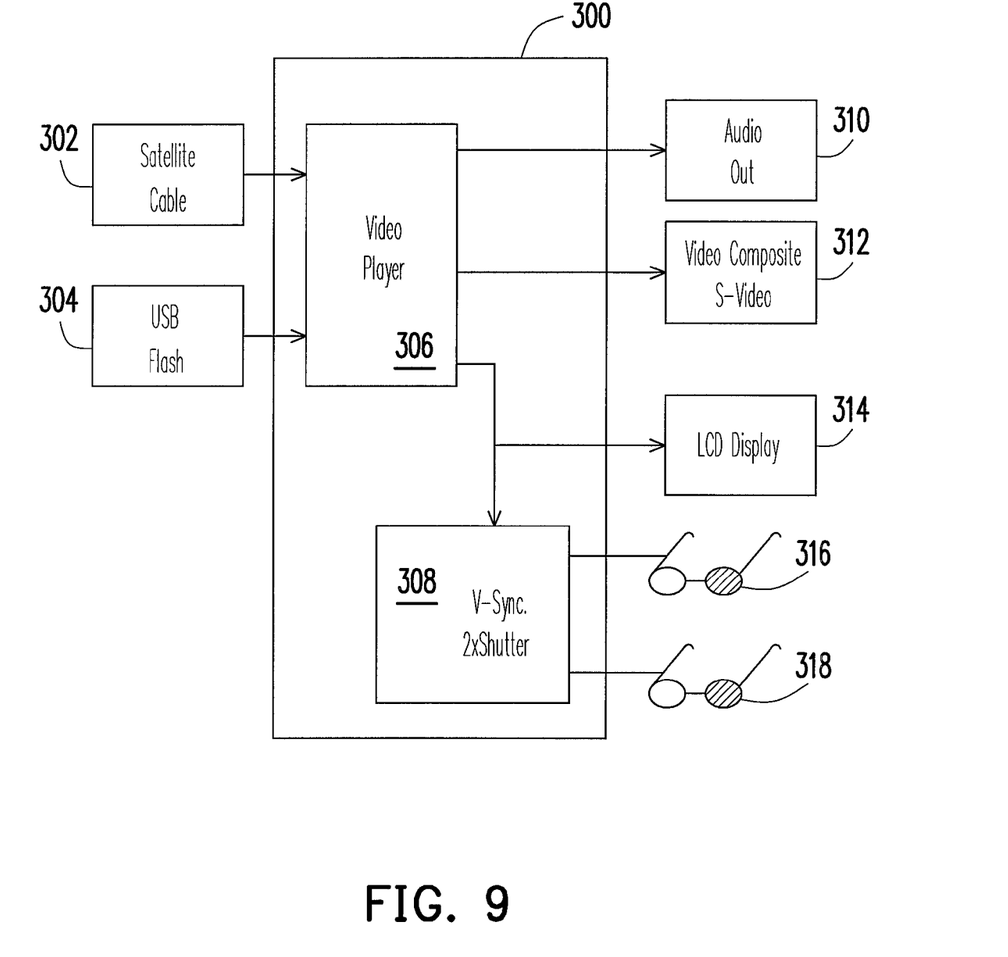
FIG. 9 is a drawing, schematically illustrating a time multiplexed stereo display system, according to an embodiment of the disclosure.

FIG. 9 is a drawing, schematically illustrating a time multiplexed stereo display system, according to an embodiment of the disclosure. In FIG. 9, the time multiplexed stereo display system 300 can be implemented with the shutter eyeglasses based on the operation mechanism as described above. The display system 300 includes a video player 306 and vertical synchronous unit 308, such as two viewers in this embodiment. The video player 306 can receives the image source from satellite cable 302 or hardware storage unit 304, such as USB flash memory. For the usual operation, the video player 306 outputs the audio signal from the audio output unit 310 and the video composite signal form of the S-video 312. Also, the video player 306 outputs the image signal to the display panel 314 such as LCD display panel with sufficient display frequency to display the left-eye images and the right-eye images. In order to properly open or close the shutter eyeglasses 316, 318, the shutter eyeglasses 316, 318 are controlled by the vertical synchronous unit 308.

When the shutter eyeglasses are properly controlled in accordance with displaying sequence of the image frames for the left eyes and the right eyes of multiple viewers, the image is displayed on the display panel 314, such as the LCD panel.

The LCD display panel needs a backlight module to display the image. Usually, the back light module can always provide the light source for display without turning off. However, when the left-eye image and the right-eye image are flipped in a fast speed, due to the response of the liquid crystals, the previous image may have residue for the next image, causing interference between the left eye and the right eye. For this consideration, the backlight module may be divided into several light regions. In one example, the display screen of the display panel can also be accordingly divided into N display regions, at which the corresponding portion of image data can respectively fill the image data.

Generally, the time multiplexed stereo display system includes a video player 306 to output a sequence of image frames with respect to multiple stereo-displayed images. Each of the stereo-displayed images is formed by a first-view image and a second-view image with a parallax therebetween, to have a symmetrical effect for the two eyes. The sequence of the image frames is sequentially displaying all of the first-view images and then sequentially displaying all of the second-view images. Further, a display panel, such as the LCD display 314, receives the sequence of image frames for accordingly displaying the image frames. Multiple shutter eyeglasses 316, 318 are controlled by the video player 306 through the vertical synchronous unit 308 to transmit the stereo-displayed images, respectively, in accordance with the sequence of the image frames. As a result, the two eyes for each viewer wearing their shutter eyeglasses 316, 318 can have the same symmetric effect to receive the images. Each of the shutter eyeglasses 316, 318 has a first-view glass and a second-view glass to accordingly transmit one of the first-view images and the second-view images in each display of the image frames.

Figure 10:
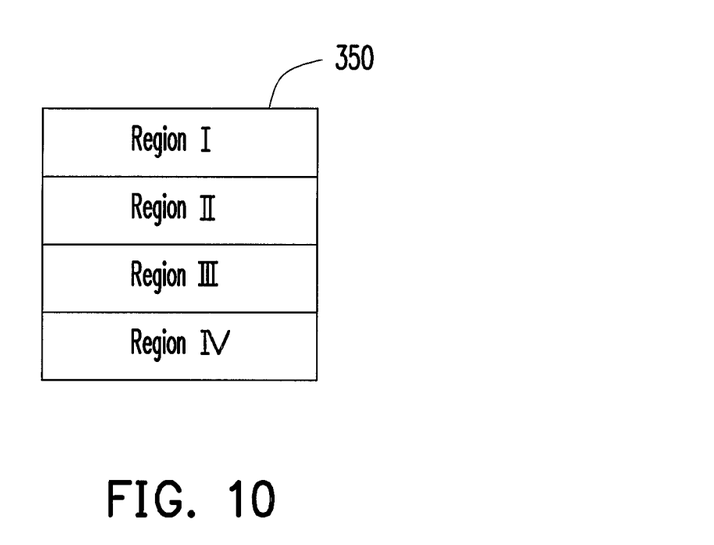
FIG. 10 is a drawing, schematically illustrating a configuration structure of backlight module, according to an embodiment of the disclosure.

FIG. 10 is a drawing, schematically illustrating a configuration structure of backlight module, according to an embodiment of the disclosure. In FIG. 10, the backlight module 350 is divided into four light regions: region I to region IV. In this embodiment, the backlight module 350 can be formed by LED light module for easy control by regions. In general, the number of the light regions can be N, N≥2. As mentioned above, the display panel can also be divided into N display regions, which can be sequentially filled with the image data or respectively filled with a portion of the image data simultaneously.

Figure 11:
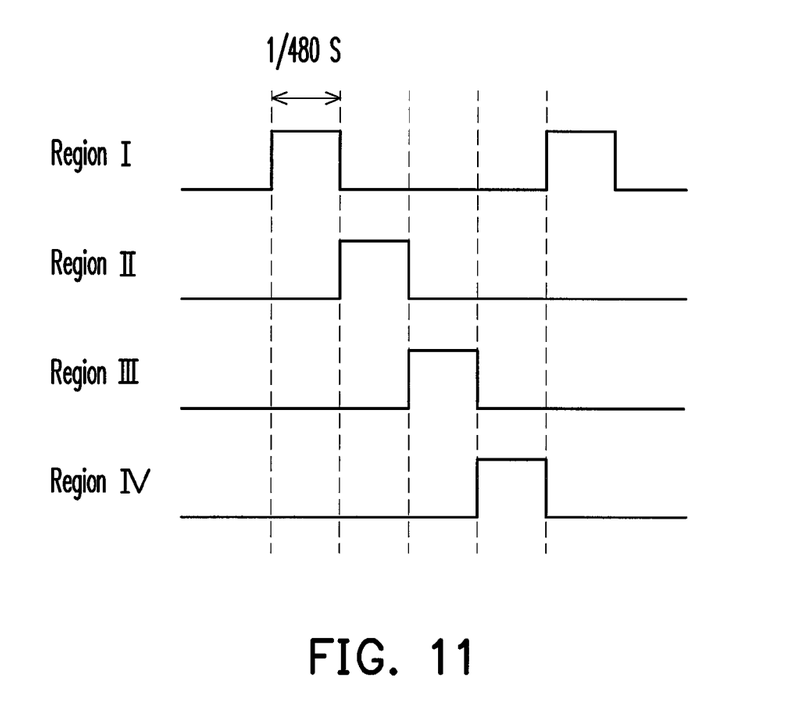
FIG. 11 is a drawing, schematically illustrating a timing control for the backlight module in FIG. 10.

FIG. 11 is a drawing, schematically illustrating a timing control for the backlight module in FIG. 10. For one example, a time period T of 1/120 second is used to display one full image frame. The four regions of the back light module 350 are sequentially turned on. In one example, the duty cycle of each light region with respect to the time period T is T/N, such as 1/480 second. However, duty cycle is also adjustable without limited to T/N.

Alternatively, the four light regions I-IV can start after the image data of this region has been fully filled in the corresponding region. This indicates that the region I can starts at a time after the vertical synchronous pulse signal starts. Even alternatively, the region I can start at a time before the vertical synchronous pulse signal starts. In this timing control of the backlight module by dividing into several light regions, the image interference can be reduced. In further example, when the display region is sequentially filled with a portion of the image data, the light regions may starts after the first display region or even the second display regions are fully filled with the corresponding portion of the image data. In other words, for this example, the light region is always turned on later after making sure that the image data to be displayed at this light region has been fully filled.

Figure 12:
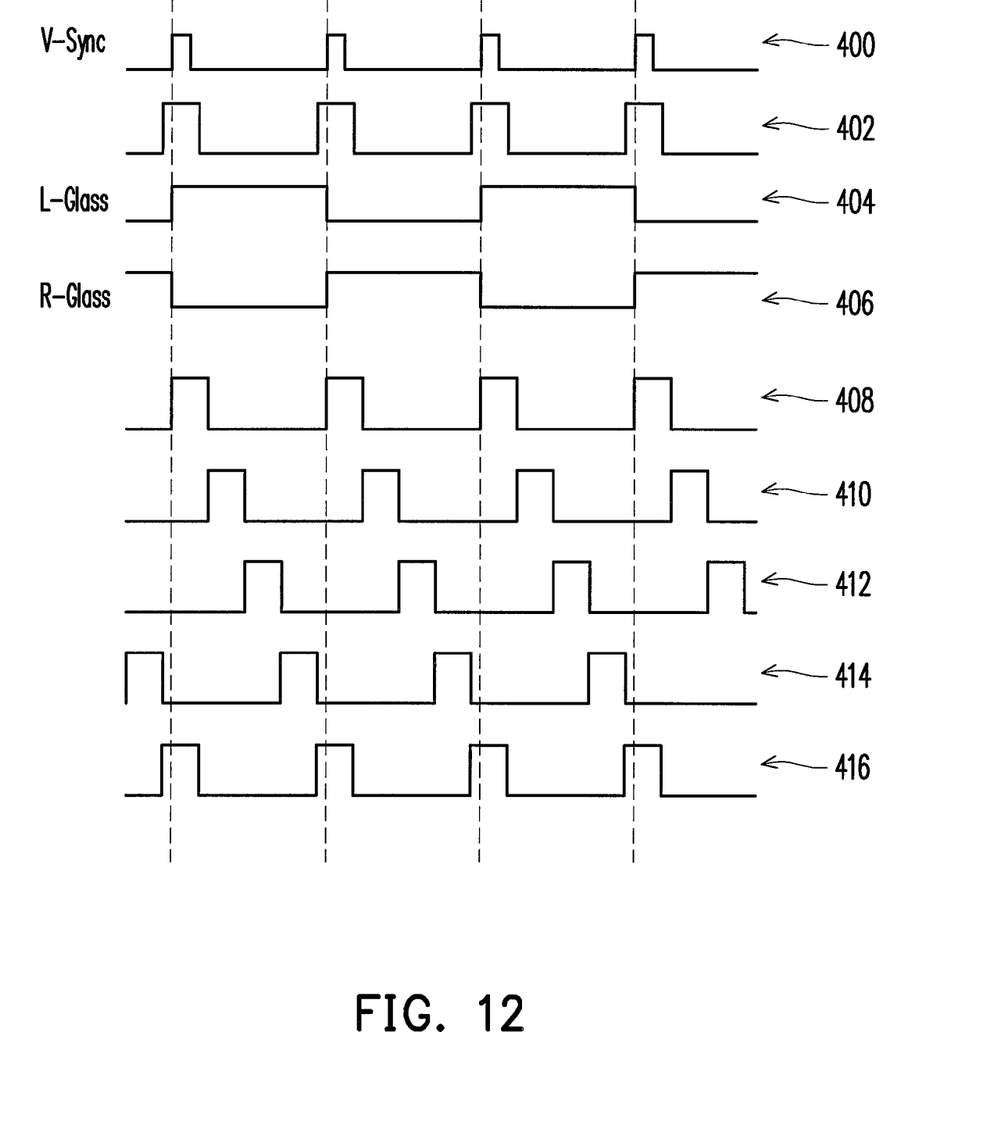
FIG. 12 is a drawing, schematically illustrating another timing control for the backlight module in FIG. 10.

FIG. 12 is a drawing, schematically illustrating another timing control for the backlight module in FIG. 10. In FIG. 12, another example to control the backlight module in relating with the left-eye glass (L-Glass), and the right-eye glass (R-Glass) is disclosed. The vertical synchronous signal 400 in a form of pulse signal shows the time to display each image frame with a time period T. The signal 402 represents that the four light regions are turned on at the same time after four display regions are respectively and fully filled with the corresponding portion of the image data. However, the displaying duty cycle is reduced to ¼. The signal 404 is the timing control for the left-eye glass. The signal 406 is the timing control for the right-eye glass.

Further in alternative control mechanism for the back light module, the signals 408, 410, 412, and 414 represent the timing control for the four light regions being sequentially turned on. However, after the four light regions are sequentially turned on, a light strobe as indicated at the signal 416 is shown. For the signal 416, it indicates that all of the four light regions are turned on simultaneously.

It can be understood that the number of the light region, N, is 4 as an example. Actually, N can be greater than or equal to 2. Also, depending on the allowable operation speed in display, the number of the viewers to be involved can be properly achieved.

By the help in control of the backlight module, the image interference can be reduced. Also and, the image brightness can be controlled by adjust the duty cycle for each light region.

In the embodiments of the disclosure, the left eye of the viewer B can view the image before the right-eye image of the viewer A is displayed. The right eye of the viewer A can view the image after the left-eye image of the viewer B is displayed. In this manner, the two eyes do not have to wait long until all of the other viewers completely view their full stereo-displayed image. The backlight module is further disclosed, in which the image interference or cross-talk can be at least reduced.

It will be apparent to those skilled in the art that various modifications and variations can be made to the structure of the disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A time multiplexed stereo display system, comprising:
a video player to output a sequence of image frames with respect to multiple stereo-displayed images, wherein each of the stereo-displayed images is formed by a first-view image and a second-view image with a parallax therebetween, wherein the sequence of the image frames is alternatively displaying all of the first-view images and then displaying all of the second-view images with respect to each of the stereo-displayed images;
a display panel, receiving the sequence of image frames for accordingly displaying the image frames, wherein the display panel is divided into N display regions, N≥2;
a backlight module to provide a backlight source to the display panel, wherein the backlight module is also divided into N light regions, and the N light regions are not overlapping to one another;
a control unit, coupled to the display panel and the backlight module to control the N display regions for sequentially displaying a part of the image and control the N light regions to be accordingly turned on/off for sequentially providing a portion of the backlight source to the display panel; and
a plurality of shutter eyeglasses, controlled by the video player to transmit the stereo-displayed images, respectively, in accordance with the sequence of the image frames, wherein each of the shutter eyeglasses has a first-view glass and a second-view glass to accordingly transmit one of the first-view images and the second-view images in each display of the image frames,
wherein the first-view images and the second-view images are symmetrically transmitted to the first-view glass and the second-view glass of each one of the shutter eyeglasses.

2. The time multiplexed stereo display system of claim 1, wherein the video player comprises a timing controller to control the display panel and the shutter eyeglasses for a vertical synchronous control.

3. The time multiplexed stereo display system of claim 1, wherein the N light regions are sequentially turned on when the N display regions are also sequentially filled with data.

4. The time multiplexed stereo display system of claim 3, wherein the N light regions are sequentially turned on according to a duty cycle of a time period T for each one of the image frame.

5. The time multiplexed stereo display system of claim 4, wherein the duty cycle is adjustable or T/N.

6. The time multiplexed stereo display system of claim 4, wherein the N light regions are simultaneously turned on when the N display regions are respectively fully filled data.

7. The time multiplexed stereo display system of claim 4, wherein after the N light regions are sequentially turned on, all of the N light regions is also turned on at the same for a period of time.

8. The time multiplexed stereo display system of claim 1, wherein the first-view images are sequentially displayed and then the second-view images are sequentially displayed, wherein the first-view glasses of the shutter eyeglasses are respectively opened one-by-one for transmitting the first-view images while the second-view glasses are all closed for blocking the second-view images, wherein the second-view glasses of the shutter eyeglasses are respectively opened for transmitting the second-view images while the first-view glasses are all closed for blocking the first-view images,
wherein the first-view images and the second-view images are symmetrically transmitted to the first-view glass and the second-view glass of each one of the shutter eyeglasses.

9. The time multiplexed stereo display system of claim 1, the first-view glasses are left-eye glasses or right-eye glasses, and the second-view glasses are left-eye glasses or right-eye glasses different from the first-view glasses,
wherein the first-view images and the second-view images are symmetrically transmitted to the left-eye glass and the right-eye glass of each one of the shutter eyeglasses.

10. A display apparatus comprising:
a display panel to display an image, wherein the display panel is divided into N display regions, N≥2;
a backlight module to provide a backlight source to the display panel, wherein the backlight module is also divided into N light regions; and
a control unit, coupled to the display panel and the backlight module to control the N display regions for sequentially displaying a part of the image and control the N light regions to be accordingly turned on/off for sequentially providing a portion of the backlight source to the display panel, wherein the N light regions are not overlapping to one another.

11. The display apparatus of claim 10, wherein the N light regions are sequentially turned on according to a duty cycle of a time period T for each one of the image frame, wherein the duty cycle is less than 80%, wherein backlight module also provides a period to turn on all of the N light regions at the same time after the N light regions are sequentially turned on.

12. The display apparatus of claim 11, wherein the duty cycle is adjustable or T/N.

13. The display apparatus of claim 10, wherein the N light regions are simultaneously turned on when the N display regions are respectively fully filled data.

14. The display apparatus of claim 10, wherein after the N light regions are sequentially turned on, the entire N light regions are turned on at the same for a period of time.

15. The display apparatus of claim 10, wherein the N light regions are sequentially turned on starting at a time before a vertical synchronous pulse signal starts or after a portion of the image data are fully filled into the first one of the N light regions.

16. A time multiplexed stereo display method, implemented in a display system having a video player to output a sequence of image frames and a display panel to display the image frames, the method comprising:
dividing the display panel into N display regions, N≥2;
providing a backlight module to provide a backlight source to the display panel, wherein the backlight module is also divided into N light regions and the N light regions are not overlapping to one another;
providing a control unit, coupled to the display panel and the backlight module to control the N display regions for sequentially displaying a part of the image and control the N light regions to be accordingly turned on/off for sequentially providing a portion of the backlight source to the display panel; and
providing a plurality of shutter eyeglasses for a plurality of viewers, each of the shutter eyeglasses having a first-eye glass and a second-eye glass, wherein the first-eye glasses are opened one-by-one for just transmitting one of the image frames, after then, the second-eye glasses are opened one-by-one for just transmitting one of the image frames,
wherein the image frames, having a first-eye image and a second-eye image of each one of the viewers, are symmetrically transmitted to the first-eye glass and the second-eye glass of each one of the viewers, and an interval between the first-eye glass and the second-eye glass of the same viewer being opened is the same.

17. The time multiplexed stereo display method of claim 16, wherein the first-eye glasses and the second-eye glasses are opened one-by-one in a sequence of LL . . . RR . . . or RR . . . LL . . . , wherein L represents an individual left-eye glass being opened and R represents an individual right-eye glass being opened, wherein a pair of L and R in sequence represents one of the shutter eyeglasses,
wherein the first-eye image and the second-eye image of each one of the viewers are symmetrically transmitted, and the interval between the left-eye glass and the right-eye glass of the same viewer being opened is the interval of transmitting all first-eye images or all second-eye images for all the other viewers.

* * * * *